June 12, 1956 — L. L. GAGNON — 2,749,800
OPHTHALMIC MOUNTINGS
Filed Aug. 29, 1952 — 2 Sheets-Sheet 1
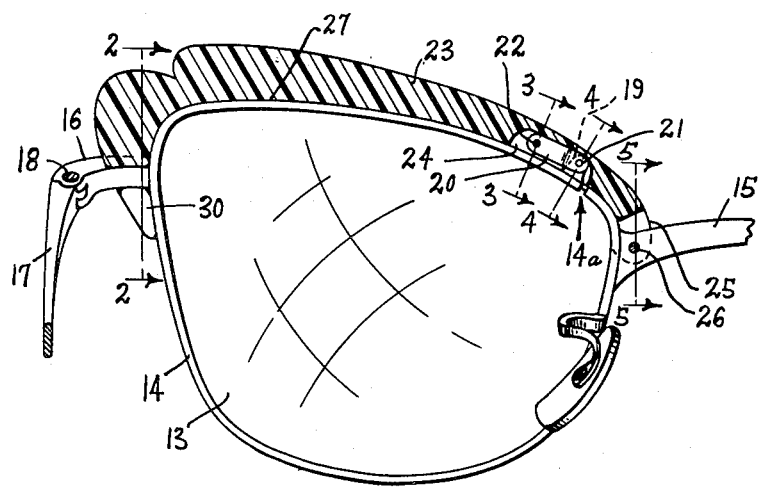
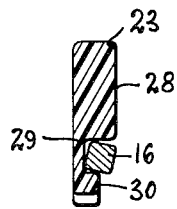
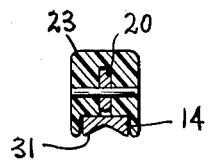
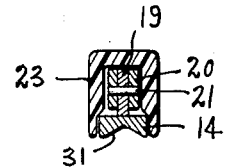
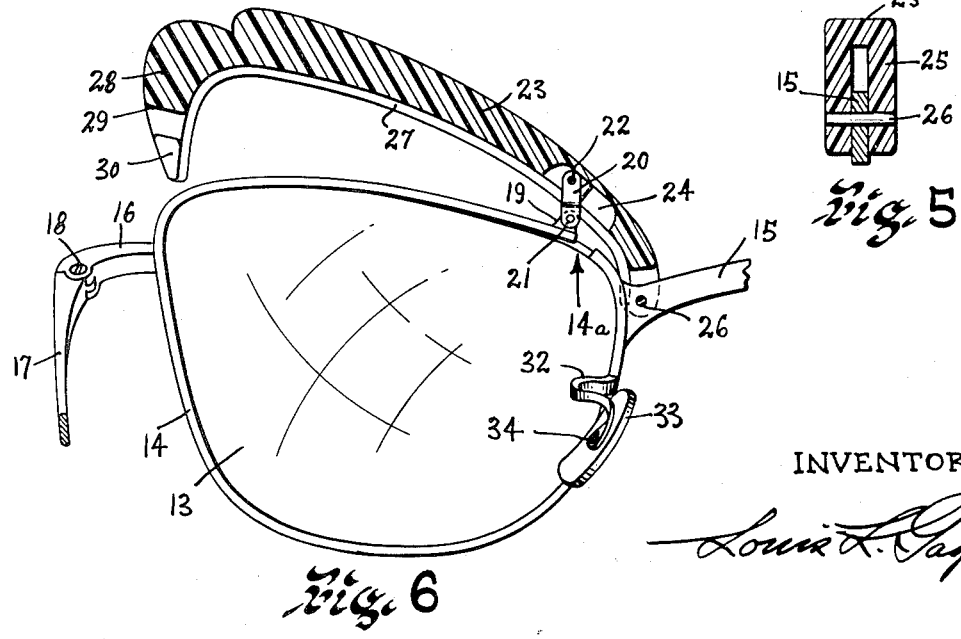
INVENTOR
Louis L. Gagnon June 12, 1956 L. L. GAGNON 2,749,800
OPHTHALMIC MOUNTINGS
Filed Aug. 29, 1952

INVENTOR.
Louis L. Gagnon

United States Patent Office 2,749,800
Patented June 12, 1956

2,749,800

OPHTHALMIC MOUNTINGS

Louis L. Gagnon, Southbridge, Mass., assignor to American Optical Company, Southbridge, Mass., a voluntary association of Massachusetts Application August 29, 1952, Serial No. 307,028

2 Claims. (Cl. 88—47)

This invention relates to improvements in ophthalmic mountings and has particular reference to mountings of the type having a rim surrounding the lenses and having decorative trims on the upper portions of the rims.

One of the principal objects of the invention is to provide a mounting of the above character wherein the decorative trims on the upper portions of the rims are so associated with cooperating mechanism as to automatically clamp and hold the lenses in the rims when said trims are moved into final positional relation with said rims.

Another object is to provide completely detachable trims of the above character which when placed in assembled relation with the rims will function automatically to clamp and hold the lenses in said rims.

Another object is to provide trims of different decorative contour and color for use with mountings of the character described.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claim. I, therefore, do not wish to be limited to the exact details of contruction and arrangement of parts shown and described as the preferred forms only have been given by way of illustration.

Referring to the drawings:

Fig. 1 is a fragmentary rear elevational view of a mounting embodying the invention;

Figs. 2, 3, 4, and 5 are sectional views taken along lines 2—2, 3—3, 4—4, and 5—5 respectively of Fig. 1 and looking in the direction indicated by the arrows;

Fig. 6 is a view generally similar to Fig. 1 showing the decorative trim in disassociated relation with the upper portion of the rim and illustrating how the rims surrounding the lens opens to permit interchangement of the lens and further illustrating how the lens may be clamped in the rim when the decorative trim is in position of use;

Figure 7:
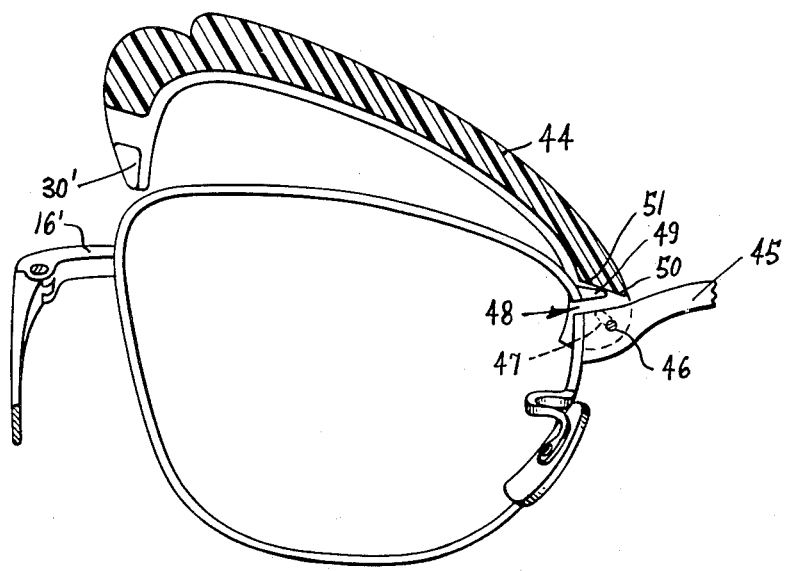
Fig. 7 is a view generally similar to Fig. 6 showing a modified form of the invention.

Referring to the drawings wherein like characters of reference designate like parts throughout the several views, the mounting illustrated in Fig. 1 comprises a pair of lenses 13 surrounded by metallic rims 14 shaped to the contour shape of the lens and having divided ends 14a adjacent the nasal sides thereof. The rims 14 are connected by a bridge member 15 and have temple endpieces 16 on the temporal sides thereof to which the temples 17 are pivotally connected as illustrated at 18. Adjacent one of the divided ends 14a, there is a lug 19 having a link 20 pivotally connected thereto as illustrated at 21. The link 20 has its opposed end pivotally connected at 22 to an upper trim portion 23 inwardly of a recess 24 formed in the underside of said trim as a clearance for the link 20 and pivotal connections 21 and 22 respectively. The trim 23 has a bifurcated end 25 shaped to straddle the bridge 15 and which is pivotally connected thereto by suitable pivot means 26 such as a pin, screw or other desirable means. The trim 23 is further provided throughout its inner side with a channel 27 extending throughout the length thereof and adapted to receive and intimately fit with the adjacent portions of the rim 14. The temporal end of the trim has a depending portion 28 which is notched, as illustrated at 29 in Figs. 1 and 2, to receive and fit about the shank of the endpiece 16. The notch extends inwardly of the rear surface of the depending portion 28 and has a lower shouldered portion 30 adapted to fit beneath and latch with the endpiece 16 to hold the trim 23 in intimately fitted relation with the upper portion of the rim 14. By reference to Figs. 1 and 6, it will be seen that when the shouldered portion 30 is unlatched with the endpiece 16 and is raised, as illustrated in Fig. 6, the link 20 will draw the end of the rim to which it is connected by the lug 19 away from the adjacent opposed end of the rim whereby the lens 13 may be removed from the rim. The trim 23 swings upwardly about its pivotal connection 26 with the bridge member 15. When the trim 23 is moved downwardly into fitted position with the main supporting structure of the mounting, as illustrated in Fig. 1, the link 20 will force the end of the rim to which it is connected by the lug 19 towards the opposed divided end of the rim and draw said rim 14 into intimate binding relation with the edge of the lens 13. It is to be understood, of course, that the inner portion of the rim 14 is bevelled to receive a suitable bevel which is formed on the lens in a conventional manner. This bevel is shown at 31 in Figs. 3 and 4.

The rims further have suitable nose pad supporting arms 32 secured thereto as by solder or other similar means and to which nose pads 33 are pivotally connected, as illustrated at 34. The rims 14, bridge 15, temple supporting endpieces 16, and nose pad supporting arms 32 are preferably all formed of metal in joined rlation with each other whereby the mounting may be adjusted to the particular facial requirements of the wearer. It is to be understood, however, that one or more or all of the said parts may be formed of other materials, if desired. The trims 23 are preferably formed of non-metallic material or may be formed of metal or any other material and may be shaped to any other contour shape or decorative configuration but must have its lower contour shape controlled so as to be that of the upper shape of the rim whereby it will intimately fit with the rim positioned within the groove 27 and which extends throughout the length of said trim. The trims 23 may also be formed to different colors and provided with different surface engravings or decorations as desired.

Figure 10:
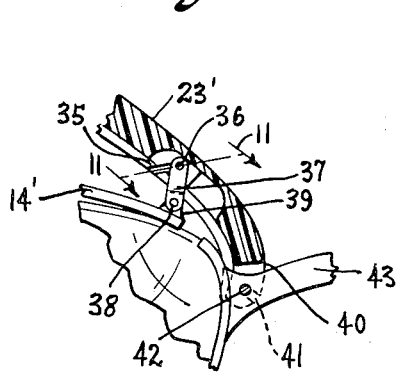
Fig. 10 is a fragmentary view similar to the nasal end of Fig. 6 illustrating a further modification of the invention.
Figure 11:
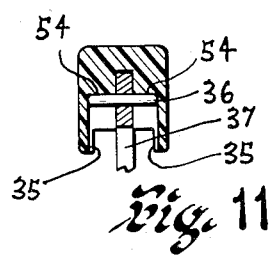
Fig. 11 is an enlarged sectional view taken as on line 11—11 of Fig. 10 and looking in the direction indicated by the arrows.

In the construction illustrated in Figs. 1 through 6, a trim is shown as being connected with the bridge and link member 20 by pins, screws or other suitable members. However, if it is desired to form the trim 23 detachable, the said trim, as shown in Figs. 10 and 11, may be provided with opposed downwardly and inwardly angled grooves 35 formed in the inner side walls thereof in which the pivot pin 36 for the link 37 may be positioned with the said pin 36 seating against the bases of the grooves 35, as illustrated at 54, when the trim 23′ is moved downwardly toward the lens rim 14. The link 37 is pivotally connected at 38 to a lug 39 carried by the adjacent end of the rim 14 in a manner similar to the link 20. The temporal end of the trim 23′ is formed in a manner similar to that of the trim 23 of Fig. 6. The trim 23′, as shown in Fig. 10, has its bifurcated end 40 notched, as illustrated at 41, to receive the pivot pin or other suitable means 42 carried by the bridge 43. It will be seen that by disconnecting the notched portion 41 from the pin 42 and by sliding the pivot pin 36 outwardly of the opposed groove 35, the trim 23′ may be completely removed from the mounting. In this instance, trims of different decorative contours and colors may be provided and interchangeably used with the main lens supporting structure. It is further pointed out that the automatic clamping of the lens in the rims 14′ will take place when the trims 23 are in final position of use on the main supporting mounting.

Figure 8:
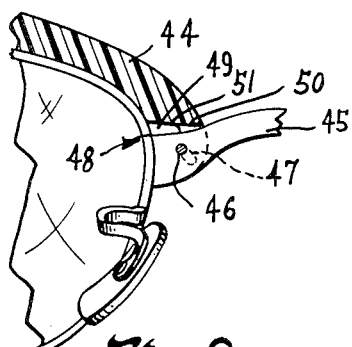
Fig. 8 is a fragmentary view of the nasal end of the mounting illustrated in Fig. 7 showing the parts in interfitting position of use and illustrating how the lens is clamped in the rim.

In Figs. 7 and 8, there is shown a slight modification wherein the trim 44, similar to the trims 23 and 23′, is pivotally connected with the bridge 45 by a pin, screw or other suitable means 46. The end of the trim 44 is bifurcated so as to straddle the bridge and has a slot 47 extending through both of the bifurcated portions and in which the pin 46 is extended. The rims are divided at 48 and the upper divided end of the rim is provided with a wedge block 49 secured thereto by soldering, welding or other suitable means. The wedge block 49 engages an angled undercut surface 50 formed in the base of the bifurcated end of the trim 44. It is to be noted in Fig. 7 that when the trim 44 is in a raised position, the divided ends 48 of the rims spread apart whereby a lens may be positioned inwardly of or removed from the surrounding rim. The wedge 49 has an upper surface 51 which is angled inwardly and upwardly with respect to the plane of the end of the divided portions of the rims. The slots 47 in which the pin 46 extends are angled inwardly and upwardly whereby the downward movement of the trim 44 into intimate fitted relation with the upper portion of the divided rim surrounding the lens will cause said divided ends 48 to close in toward each other and thereby cause said rims to become intimately related with the edge of the lens. Here again, the rims and the edges of the lenses are bevelled to interfit with each other.

The angle of the upper surface 51 of the wedge 49, the angle of the base of the bifurcated end of the trim, and the angle of the slots 47 are such as to provide a compound motion drawing said divided ends 48 of the rims together. This is due to the fact that the base 50 is angled slightly downwardly and inwardly with respect to the longitudinal center line of the trim and that the upper surface 51 of the wedge block 49 is angled inwardly and upwardly with respect to the plane of the divided ends of the rims and that the slots 47 are angled inwardly and upwardly with respect to the plane of the base surface 50 so that a center line extending longitudinally of the slots 47 will intersect the plane of the base surface 50 in a direction inwardly towards the center line of the mounting. When the trim 44 is moved in a downward direction, the base surface 50 engaging the upper surface 51 of the wedge will immediately cause said upper divided end of the rim to move in a downward direction toward the opposed divided end of the rim. Continued motion will cause the inner edge of the base surface to engage the side of the rim directly above the base of the wedge block 49 and this will, in turn, cause the slotted portions 47 to move downwardly of the pin 46 to further cause said divided ends of the rims to move toward each other. When the opposed shouldered end 30′ of the trim is latched with the endpiece 16′, the rim surrounding the lens will be in intimate binding relation with the lens, it being understood, of course, that the amount of movement introduced by said angled surfaces and angled slots is such as to bring about this result. If desired, the angles of the base surface 50 and upper surface 51 may be so controlled as to obviate the slots 47 in which instance, the pin 46 would be directly pivotally connected with the branches of the bifurcated ends which straddle the bridge. However, this would require greater pivotal movement of the trim 44.

Figure 9:
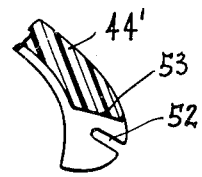
Fig. 9 is a fragmentary nasal end view of the trim illustrating a further modification of the invention.

If it is desired to form the trim removable, the slots 47 may be extended clear outwardly through the end surfaces of the branches of the bifurcation as shown at 52 in Fig. 9. However, the trim 44′, in this instance, would be otherwise constructed generally similar to the trim 44 of Fig. 8. The angle of the notches 52 would be similar to those of the slots 47 and the angle of the base 53 of the bifurcated end would be angled in a manner similar to the base 50. The trim 44′ otherwise would function in a manner similar to the trim 44 and is for use with a mounting constructed as shown in Fig. 8.

It is particularly pointed out that when the trims 23, 44, etc. are in raised position, the depending temporal end portions are initially located inwardly of the temporal end portions of the main metallic mounting as shown in Figs. 6 and 7. Because of this, as the trims 23, 44, etc. are moved downwardly toward the main metallic rims, the lower end of the depending portions will spring outwardly to receive said upper portions of the metallic rims and will thence spring inwardly when the shouldered portions 30 or 31, as the case may be, are snapped beneath the temple endpieces 16 or 16′. This firmly locks the rims in position of use.

It is further pointed out that the mechanical parts are concealed from view when the trim is in final position of use.

From the foregoing description, it will be seen that simple, efficient and economical means have been provided for accomplishing all of the objects and advantages of the invention.

Having described my invention, I claim:

1. A lens supporting structure for an ophthalmic mounting comprising a pair of metallic lens rims joined on the nasal sides thereof by a bridge portion and having endpiece portions on the temporal sides thereof to which temples may be connected, the upper section of each of said lens rims intermediate the bridge portion and endpiece portions being divided adjacent one of said portions and each having a decorative trim formed with a longitudinal channel in the underside thereof and extending throughout the distance between said bridge portion and endpiece portions and adapted to receive said upper sections of said rims, each of said decorative trims having its end nearest the divided ends of the rims rotatably connected to the adjacent portion of the lens supporting structure to permit said decorative trim to be swung upwardly or downwardly with respect to said rim, said decorative trim, in the vicinity of said divided ends of the rim having a recess communicating with the channel in the underside thereof, an outwardly extending lug on the free one of said divided ends of the rim, said trim, inwardly of the recess thereof, having a portion for engaging said lug for exerting a force thereon from a direction opposite the divided ends of the rim and forcing said divided ends toward each other when the trim is moved to closed position, and said trim, on the opposed end thereof, having a resilient latch portion adapted to be detachably latched with the other of said portions of said supporting structure to hold said trim in closed position, the length of said trim with respect to the distance between the end thereof connected with said adjacent portion of the lens supporting structure and the portion thereof engaging the lug being several times said distance whereby a long lever arrangement is provided for moving the divided ends of the rim towards each other and for rigidly clamping a lens in said rim when the trim is in latched relation with the other of said portions.

2. A lens supporting structure for an ophthalmic mounting comprising a pair of metallic lens rims joined on the nasal sides thereof by a bridge portion and having endpiece portions on the temporal sides thereof to which temples may be connected, the upper section of each of said lens rims intermediate the bridge portion and endpiece portions being divided adjacent one of said portions and each having a decorative trim formed with a longitudinal channel in the underside thereof and extending throughout the distance between said bridge portion and endpiece portions and adapted to receive said upper sections of said rims, each of said decorative trims having its end nearest the divided ends of the rims rotatably connected to the adjacent portion of the lens supporting structure to permit said decorative trim to be swung upwardly or downwardly with respect to said rim, said decorative trim, in the vicinity of said divided ends of the rim having a recess communicating with the channel in the underside thereof, a link member pivotally connected adjacent one end thereof to said trim within said recess and having its other end pivotally connected to the adjacent free one of said divided ends of the rim whereby upward and downward movement of the trim about its connection to said adjacent portion of the supporting structure will cause said divided ends to move toward and away from each other to permit the insertion or removal of a lens from said rim, and said trim, on the opposed end thereof, having a resilient latch portion adapted to be detachably latched with the other of said portions of said supporting structure to hold said trim in closed position, the length of said trim with respect to the distance between the end thereof connected with said adjacent portion of the lens supporting structure and its pivotal connection with the link being several times said distance whereby a long lever is provided for moving the divided ends of the rims towards each other and for rigidly clamping a lens in said rim when the trim is in latched relation with the other of said portions.

References Cited in the file of this patent

UNITED STATES PATENTS

| | | |
|---|---|---|
| 319,733 | Lazarus | June 9, 1885 |
| 2,071,893 | Nerney | Feb. 23, 1937 |
| 2,350,338 | Casavant | June 6, 1944 |
| 2,577,380 | Stegeman | Dec. 4, 1951 |

FOREIGN PATENTS

| | | |
|---|---|---|
| 89,954 | Germany | Jan. 4, 1897 |